United States Patent [19]

Okuda et al.

[11] Patent Number: 4,772,967
[45] Date of Patent: Sep. 20, 1988

[54] MAGNETIC RECORDING APPARATUS IN A HELICAL SCAN SYSTEM

[75] Inventors: Hiroyuki Okuda, Daito; Masaru Doi, Hirakata; Yoshiaki Shimizu, Mino; Takao Yamano, Osaka; Kazuo Ino; Koso Ishihara, both of Daito, all of Japan

[73] Assignee: Sanyo Electric Co., Ltd., Osaka, Japan

[21] Appl. No.: 927,487

[22] Filed: Nov. 6, 1986

[30] Foreign Application Priority Data

Nov. 13, 1985 [JP] Japan .................. 60-254142
Dec. 13, 1985 [JP] Japan .................. 60-281585

[51] Int. Cl.$^4$ .................. G11B 5/024; G11B 5/187; G11B 5/53; G11B 5/23
[52] U.S. Cl. .................. 360/84; 360/118; 360/104; 360/119
[58] Field of Search .................. 360/118, 104, 84, 66, 360/14.1, 119, 120

[56] References Cited

U.S. PATENT DOCUMENTS 4,180,835  12/1979  Okumura et al. .................. 360/120
4,520,405  5/1985  Sasaki et al. .................. 360/84

FOREIGN PATENT DOCUMENTS

0144139  6/1985  European Pat. Off. ............ 360/118
60-89806  5/1985  Japan .................. 360/118
61-3306  1/1986  Japan .................. 360/118

Primary Examiner—John H. Wolff
Assistant Examiner—Matthew J. Bussan
Attorney, Agent, or Firm—Armstrong, Nikaido, Marmelstein & Kubovcik

[57] ABSTRACT

A magnetic recording apparatus of a helical scanning system comprises a rotary cylinder (13), recording heads (A and B) and an erase head (10) attached to slightly project from a rotating surface (13a) of the cylinder (13). The rotary erase head (10) has a gap (4) comprising a ferrite core half (1) and a Sendust film (3) formed on a ferrite core half (2) opposed to the ferrite core half (1) and having a larger saturation magnetic flux density. In addition, the recording heads (A and B) and the rotary erase head (10) are attached on the rotary cylinder (13) so that an end (P1) located forward with respect to the tape travelling direction (11) of the Sendust film (3) may trace the backward side with respect to the tape travelling direction (11), apart by a distance which is a half of the gap length of the rotary erase head (10), as compared with a forward end (Q) of a recorded track pattern (15a) formed on a tape (14) by the recording head (A) scanning immediately after erasing by the rotary erase head (10).

11 Claims, 8 Drawing Sheets

MAGNETIC RECORDING APPARATUS IN A HELICAL SCAN SYSTEM

BACKGROUND OF THE INVENTION

1. Field of the Invention

The present invention relates to a magnetic recording apparatus, and more particularly to a magnetic recording apparatus, such as a video tape recorder (VTR) of a helical scanning system, comprising a rotary erase head for performing smooth editing of tape such as perfect assembly recording and insert assembly recording.

2. Description of the Prior Art

In order to perform smooth editing of tape such as perfect assembly recording and insert assembly recording in a VTR of a helical scanning system, it is important that a rotary erase head scans a tape immediately before a recording head scans the tape so that erasing and recording can, be repeatedly, in that order, performed for each individual picture.

Figure 1:
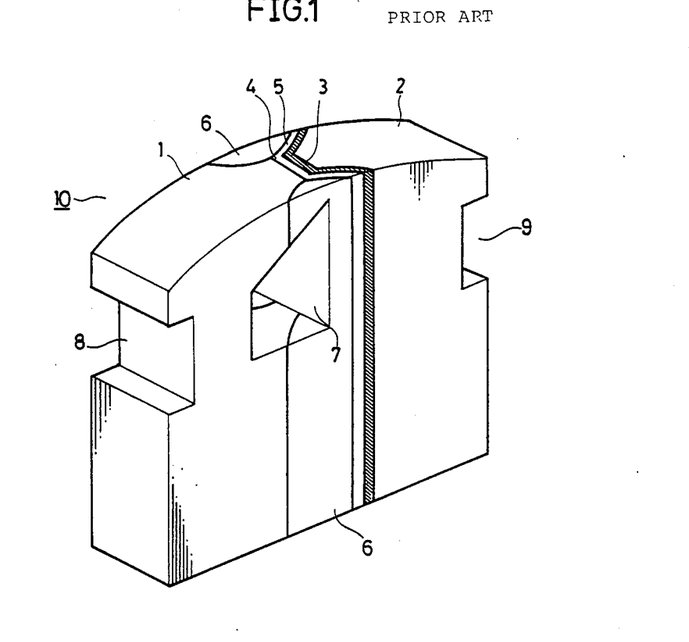
FIG. 1 is a perspective view showing an example of a rotary erase head used in a conventional 8 mm VTR.
Figure 2:
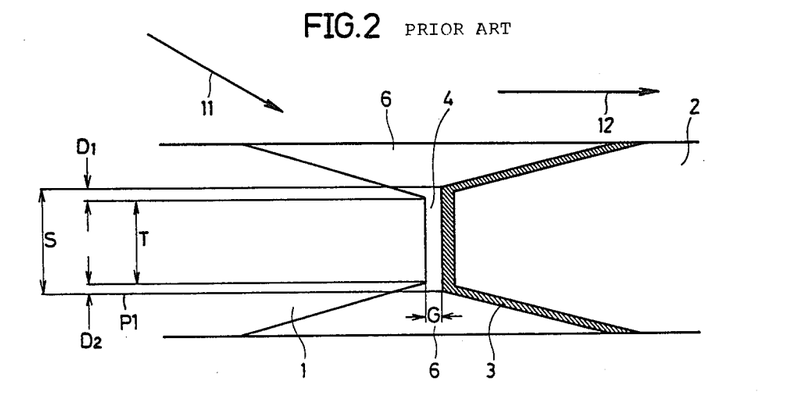
FIG. 2 is a plan view showing diagrammatically the neighborhood of a gap of the rotary erase head shown in FIG. 1.

FIG. 1 is a perspective view showing one example of such a rotary erase head used in a 8 mm VTR utilizing a metal tape having high coercive force to obtain a high recording density, and FIG. 2 is a plan view showing diagrammatically a portion in the neighborhood of a gap of the rotary erase head. The rotary erase head as shown in FIGS. 1 and 2 is disclosed in, for example, an article, IEEE Transaction on Magnetics MAG-20, 1984, pp. 869–871.

The structure of the rotary erase head shown in FIGS. 1 and 2 is described below. In FIG. 1, halves 1 and 2 of a Mn-Zn ferrite core having a saturation magnetic flux density of approximately 5000G are provided opposed to each other, the side of the ferrite core half 2 corresponding to the forward side with respect to the travelling direction of the head. A Sendust film 3 having a saturation magnetic flux density of approximately 10000G is formed by a sputtering process to a thickness of approximately 3 $\mu$m on the surface of the ferrite core half 2 opposed to the ferrite core half 1. A gap 4 having a gap length G of approximately 3 $\mu$m is formed between the Sendust film 3 and the surface of the ferrite core half 1. A film 5 of non-magnetic materials is formed in the gap 4. In addition, a glass layer 6 is formed on both sides of the gap 4 so that it may extend outwardly. A coil (not shown) is wound through a hole 7 and notches 8 and 9. A rotary erase head 10 is thus completed.

Figure 3:
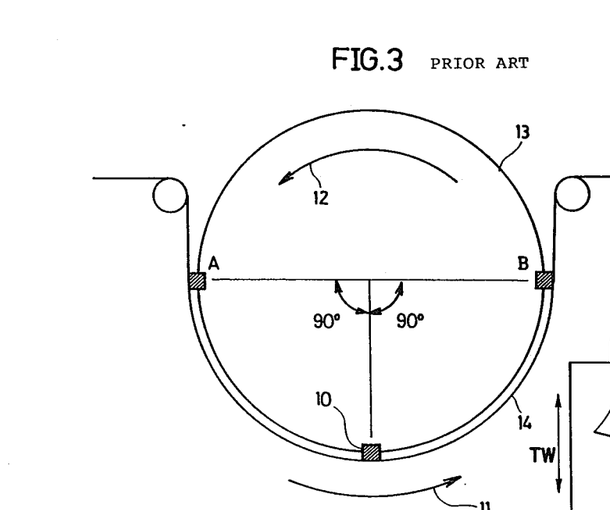
FIG. 3 is a plan view illustrating the state in which the rotary erase held shown in FIG. 1 is mounted to a rotary cylinder in a conventional VTR.
Figure 4:
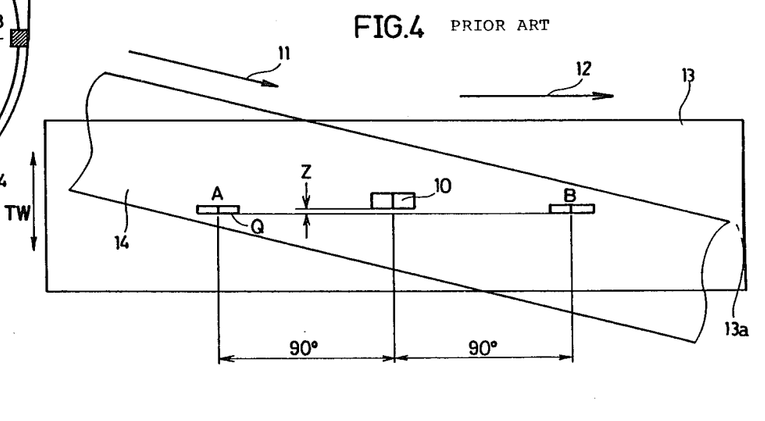
FIG. 4 is a side elevational view illustrating the state in which the rotary erase head shown in FIG. 1 is mounted to a rotary cylinder in a conventional VTR.

FIGS. 3 and 4 are a plan view and a side elevational view, respectively, illustrating the state in which the rotary erase head shown in FIG. 1 is mounted to a rotary cylinder in a conventional VTR. As shown in FIG. 3, recording heads A and B each having different azimuth are attached to the position apart from each other by 180° in the circumferential direction around the rotary cylinder 13. In addition, the rotary erase head 10 is attached to the position apart from the recording head A by 90°, in the middle position between the recording heads A and B, so that it may scan the forward portion of the tape with respect to the recording head A. A magnetic tape 14 is spirally wound around a head cylinder system comprising the cylinder and heads. As shown in FIG. 4, the dimension in the track-width direction TW (or the direction of the thickness of the rotary cylinder 13) of the rotary erase head 10 is twice the dimension in the track-width direction of each of the recording heads A and B. Furthermore, the rotary erase head 10 is displaced, by a distance Z corresponding to a half of a track pitch, upward from the recording heads A and B with respect to the axial direction of the rotary cylinder 13.

Figures 5, 11:
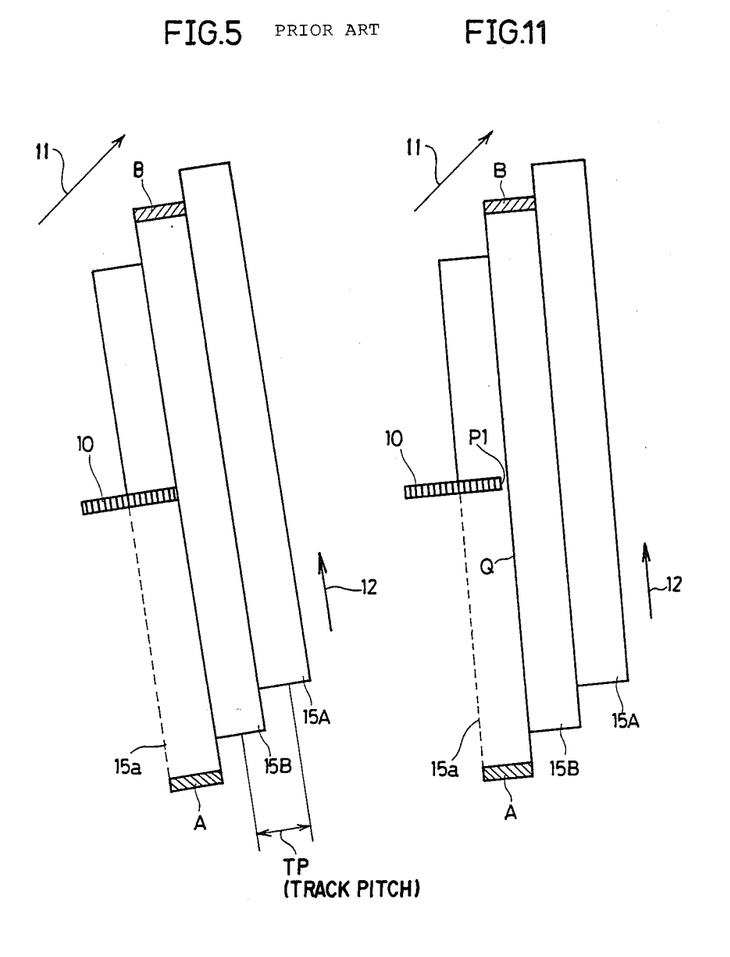
FIG. 5 is a diagram showing diagrammatically the principle of recording and erasing of a head cylinder system of the conventional VTR shown in FIG. 4.
FIG. 11 is a diagram showing diagrammatically the principle of recording and erasing of the head cylinder system of the embodiments according to the present invention shown in FIGS. 9 and 10.

FIG. 5 is a diagram showing diagrammatically the principle of recording and erasing by the conventional VTR shown in FIGS. 1 to 4. Referring now to FIGS. 1 to 5, the recording and erasing operation of the head cylinder system of the conventional VTR is described.

First, as shown in FIG. 4, it is assumed that the magnetic tape 14 spirally wound around the rotary cylinder travels diagonally, from top to bottom, with respect to the rotating direction 12 of a head. In this case, the recording heads A and B are attached to the rotary cylinder 13 so that the respective ends are located forward with respect to the tape travelling direction 11, that is, located on the lower side as shown in FIG. 4, of the respective both ends in the track-width direction of both the recording heads A and B may be in the same level with respect to the axial direction of the rotary cylinder 13. Thus, a recording track 15A by the head A and a recording track 15B by the head B are formed alternately on the magnetic tape 4 with a track pitch TP (the center-to-center distance between adjacent tracks) determined based on the tape travelling speed, as shown in FIG. 5. As described above referring to FIG. 4, each head is arranged so that the end located forward with respect to the tape travelling direction, that is, located on the lower side in FIG. 4, of the both ends in the track-width direction of the gap 4 in the rotary erase head 10 (the surface abutting to the magnetic tape) is placed backward with respect to the tape travelling direction (on the upper side in FIG. 4), by the distance Z which is a half of a track pitch with respect to the axial direction of the rotary cylinder 13, as compared with the ends located forward with respect to the tape travelling direction (located on the lower side in FIG. 4), of the respective both ends in the track-width direction of the heads A and B. Therefore, when the rotary erase head 10 is operated, erasing and recording are repeatedly performed for each one picture. For example, erasing two tracks by the rotary erase head 10 and subsequently recording by the head A (15a in FIG. 5) and recording by the head B (not shown) on the erased tracks are repeatedly performed, as shown in FIG. 5.

However, since the gap length G of the above described rotary erase head 10 is approximately 3 $\mu$m, which is approximately ten times the gap length of the recording head, and the respective both ends in the track-width direction of the Sendust film 3 and the ferrite core half 1 on the respective sides of the gap 4 are not necessarily coincident with each other, disturbance of erasing magnetic flux produced from the gap 4 (the fringing effect in the neighborhood of both ends in the track-width direction of the gap 4) can not be ignored. More specifically, as shown in FIG. 2, if the width $T_r$ of the portion in which magnetic materials on both sides with respect to the gap 4 are completely opposed to each other, is considered as the effective track width of the rotary erase head 10, there occurs a problem in which, with the arrangement of the heads shown in FIG. 4, a part of the recorded pattern 15B (in FIG. 5), formed adjacent to the erase head by the head B scanning the tape immediately before erasing by the rotary erase head 10, is erased by fringing magnetic flux from the rotary erase head 10. That is also obvious from the following Table 1. The Table 1 represents measured data showing a phenomenon in which almost the same recording and reproducing outputs can be obtained from the recording track recorded by the head A scanning the tape immediately after scanning by the rotary erase head 10, irrespective of whether or not the rotary erase head 10 is operated, whereas in the recording track recorded by the head B scanning the tape immediately before scanning by the rotary erase head 10, recording and reproducing outputs are largely reduced in the case where the rotary erase head 10 is operated, as compared with the case where it is not operated.

TABLE 1

|  | recording and reproducing outputs of 1 MHz (recording current 50 mAp-p) | | recording and reproducing outputs of 6.5 MHz (recording current 25 mAp-p) | |
| --- | --- | --- | --- | --- |
|  | head A | head B | head A | head B |
| with erasing | 257 mVp-p | 195 mVp-p | 92 mVp-p | 76 mVp-p |
| without erasing | 255 mVp-p | 253 mVp-p | 95 mVp-p | 98 mVp-p |

In addition, the recording pattern on the tape when the rotary erase head 10 is operated was observed by applying ferromagnetic colloid thereto and it could be found that a part of the recording track by the recording head B had been erased. Therefore, it can not be expected for the head cylinder system of the conventional VTR as described above to perform not only clear perfect assembly recording and insert assembly recording but also normal recording and reproducing.

Figure 6:
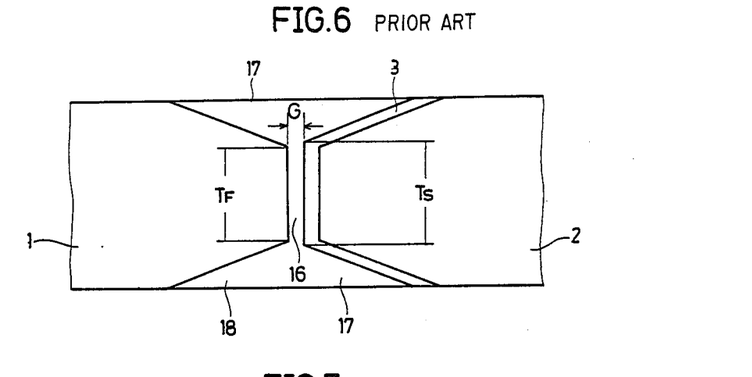
FIG. 6 is a plan view showing diagrammatically the neighborhood of an abutting surface of another rotary erase head having a structure similar to the rotary erase head shown in FIG. 1 to a tape.

On the other hand, FIG. 6 is a plan view showing diagrammatically a rotary erase head having a structure similar to that of the conventional rotary erase head shown in FIGS. 1 and 2, particularly showing a structure in the neighborhood of the surface abutting to the magnetic tape. The rotary erase head shown in FIG. 6 is applied to the 8 mm VTR similarly to the rotary erase head shown in FIGS. 1 and 2 and is disclosed in Japanese Patent Laying-Open Gazette No. 89807/1985, for example. In FIG. 6, a pair of ferrite core halves 1 and 2 opposed to each other to form the abutting surface shown in FIG. 6 are the same as those shown in FIGS. 1 and 2. The Sendust film 3 is previously formed on the ferrite core half 2. The Sendust film 3 may be replaced with a metal magnetic material film such as an amorphous and a permalloy. A gap between the ferrite core half 1 and the Sendust film 3 forms an operating gap 16. A groove 17 for regulating a track width and expanding outwardly is formed in the both side portions of the operating gap 16. The gap length G of the operating gap 16 is selected to be approximately constant, and the track width Ts on the side of the Sendust film 3 is selected to be slightly larger than the track width $T_F$ of the ferrite core half 1. The operating gap 16 and the groove 17 are filled with a glass material 18. The glass 18 in the groove 17 encapsules the area abutting the tape and provides protection for the operating gap 16.

Figure 7:
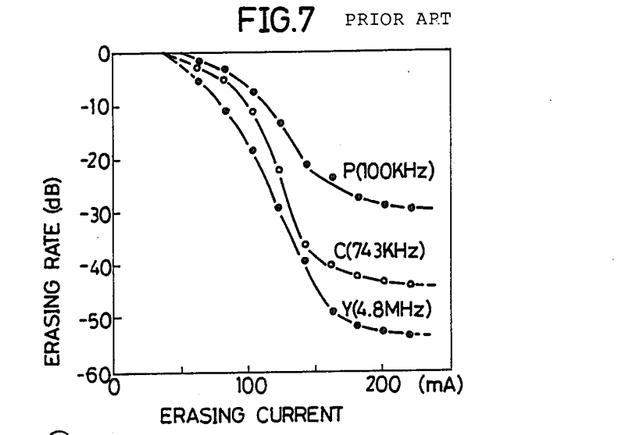
FIG. 7 is a graph showing the erasing property of the rotary erase head shown in FIG. 6.

FIG. 7 is a graph showing the erasing property of the rotary erase head shown in FIG. 6. In FIG. 7, the abscissa represents the amplitude of erasing current of 6 MHz flowing into the above described rotary erase head, the ordinate represents the erasing rate, (Y) represents the erasing property of a luminance signal, (C) represents the erasing property of a chrominance signal and (P) represents the erasing property of a pilot signal for tracking, respectively. See, for example, U.S. Pat. No. 4,297,733 for the pilot signal for tracking. For example, a rotary erase head used in a VTR must be able to erase one arbitrary frame so as to obtain clear perfect assembly recording or insert assembly recording as described above. To this end, a sufficient erasing rate and a stable erased width are required. In order to obtain such a sufficient erasing rate, a current of more than 150 mA, that is, current approximately ten times as large as normal recording current must be required, as obvious from FIG. 7.

However, as shown in FIG. 6, a rotary erase head adapted such that the gap length G of the operating gap 16 is approximately constant and the track width Ts on the side of the Sendust film 3 is slightly larger than the track width $T_F$ on the side of the ferrite core half 1 encountered a problem that if erasing current approximately ten times as large as normal recording current flows as described above, the leakage magnetic field becomes larger and the actual erased width becomes larger than the apparent track width $T_F$.

Figure 8:
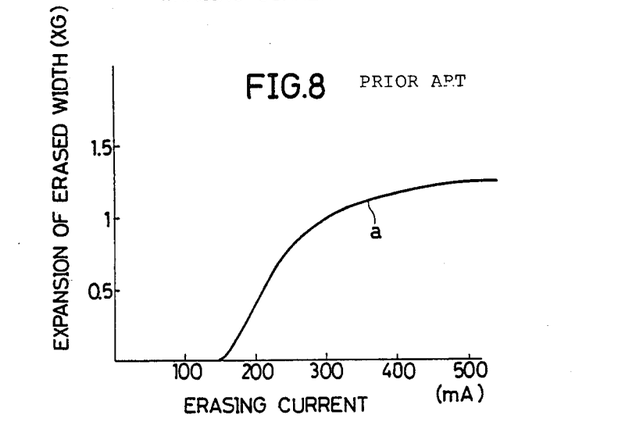
FIG. 8 is a graph showing a relation between erasing current of the rotary erase head shown in FIG. 6 and the expansion of the erased width.

In addition, there is also a problem that the actual erased width depends on the track width $T_S$ on the side of the Sendust film 3 rather than the track width $T_F$ on the side of the ferrite core half 1 and tends to change according to the erasing current value. More specifically, FIG. 8 is a graph showing a relation between erasing current (abscissa) of the rotary erase head shown in FIG. 6 and the expansion of the erased width (ordinate). As shown by a solid line in FIG. 8, the expansion of the actual erased width is approximately constant in the range of more than 400 mA of erasing current and it linearly changes in the range of 150 to 300 mA thereof. Therefore, in case of erasing current ten times as large as recording current, that is a current of 50 to 300 mA, the expansion of the actual erased width changes largely in response to a slight change in the erasing current value. Furthermore, since in many cases, an erasing current circuit for such a rotary erase head uses a resonance circuit utilizing a coil of the erase head, there has been a problem that erasing current changes according to a slight change in inductance of a magnetic head and Q of the resonance circuit, so that the erased width changes. Therefore, if and when the rotary erase head having a structure of an unstable, actual erased width is attached to the rotary cylinder 13 as shown in FIGS. 3 and 4 and employed, the fringing effect adversely affects the adjacent recording patterns formed immediately before erasing by the rotary erase head, which becomes significant. To solve these problems, it is desirable to require the strict standard of inductance of the above described magnetic head and Q of the resonance circuit and reduce the variation thereof. However, it is difficult in respect of the yield and the productivity. If erasing current is rendered large, the erased width becomes stable as shown in FIG. 8. However, it is not preferable in respect of the reliability of an electric circuit and the consumed power.

SUMMARY OF THE INVENTION

Briefly stated, the present invention is directed to a magnetic recording apparatus of a helical scanning system comprising a cylinder having a rotating surface, recording heads mounted so as to slightly project from the rotating surface of the cylinder and an erase head mounted so as to slightly project from the rotating surface of the cylinder, the erase head having a surface abutting to a recording medium, the surface comprising a pair of magnetic materials having different saturation magnetic flux densities and arranged opposed to each other to form a gap structure, and a non-magnetic material layer formed in the gap structure, and further the recording heads and the erase head being arranged so that an end located forward with respect to the tape travelling direction, of both ends in the track-width direction of the magnetic material having a larger saturation magnetic flux density, out of a pair of magnetic materials in the erase head may trace the backward portion with respect to the tape travelling direction, apart by a constant distance in the track-width direction, as compared with an end located forward with respect to the tape travelling direction, of both ends in the track-width direction of a recording track pattern formed on a tape by the recording head scanning the tape immediately after erasing by the erase head.

In accordance with another aspect of the present invention, the above described constant distance is a half of the gap length of the erase head.

In accordance with still another aspect of the present invention, the erase head is attached to be placed apart from the recording head, by a distance which is a half of a track pitch in a direction correspondihg to a backward direction with respect to the tape travelling direction, of the axial direction of the cylinder and is also attached in the position preceding by an angle of $(90° - \theta)$ in the circumferential direction relative to the recording head, where $\theta$ is determined according to the following equation:

$$\theta = 180° \times \text{(a half of the gap length of the erase head)/(a track pitch)}.$$

In accordance with still another aspect of the present invention, the erase head has a groove for regulating a track width and expands outwardly toward the track-width direction in the side portion of the gap structure, and a magnetic material having a larger saturation magnetic flux density, out of a pair of magnetic materials in the erase head has a notch in a corner facing the gap structure.

In accordance with still another aspect of the present invention, the length of the notch is approximately a half of the gap length of the erase head.

In accordance with yet still another aspect of the present invention, a magnetic recording apparatus of a helical scanning system comprises a cylinder having a rotating surface, recording heads mounted so as to slightly project from the rotating surface of the cylinder and an erase head mounted so as to slightly project from the rotating surface of the cylinder, wherein the erase head has a surface abutting a recording medium comprising a pair of magnetic materials each having the same saturation magnetic flux density and arranged opposed to each other to form a gap structure, and a non-magnetic material layer formed in the gap structure, and the recording heads and the erase head are arranged so that an end located most forward with respect to the tape travelling direction, of each end in the track-width direction of a pair of magnetic materials in the erase head may trace the backward portion with respect to the track travelling direction, apart by a constant distance in the track-width direction, as compared with an end located forward with respect to the tape travelling direction, of both ends in the track-width direction of a recording track pattern formed on a tape by the recording head scanning the tape immediately after erasing by the erase head.

Accordingly, a principal object of the present invention is to provide a magnetic recording apparatus comprising a rotary erase head capable of performing clear editing of tape such as perfect assembly recording and insert assembly recording.

Another object of the present invention is to provide a magnetic recording apparatus in which adjacent recorded pattern formed by the recording head immediately before erasing by a rotary erase head is not affected by fringing magnetic flux of the rotary erase head.

Still another object of the present invention is to provide a magnetic recording apparatus in which the actual erased width is constant and an adjacent recorded track is not affected even if erasing current changes.

A principal advantage of the present invention is that even if erasing and recording are continuously performed for each one picture in a magnetic recording apparatus such as a VTR, a part of recorded pattern formed by a recording head scanning a tape immediately before erasing by a rotary erase head is not erased by fringing flux of the rotary erase head, and outputs reproduced from recorded patterns formed by two recording heads each having different azimuth become equal and hence a clear picture image can be obtained.

Another advantage of the present invention is that the erased width of the rotary erase head can be stabilized, irrespective of a variation in erasing current, without largely increasing erasing current or damaging the reliability and the productivity of an erasing current circuit.

These objects and other objects, features, aspects and advantages of the present invention will become more apparent from the following detailed description of the present invention when taken in conjunction with the accompanying drawings.

DESCRIPTION OF THE PREFERRED EMBODIMENTS

First, according to the present invention, in order to define the fringing effect of a rotary erase head, a relation between each dimension S, T, $D_1$ and $D_2$ in the neighborhood of the rotary erase head 10 shown in FIG. 2 and the erased track width X on a tape was examined. The erased width X was measured in accordance with the following procedures:

(1) To record signals using both heads A and B while running a blank tape as usual without operating the rotary erase head 10 (signals are sinusoidal mixed waves of 4.8 MHz, 750 KHz and 100 KHz).

(2) To operate the rotary erase head 10 by a single rotation of a cylinder while the tape into which the above described signals are recorded in the still reproducing state (erasing current has a sinusoidal wave of 6.5MHz and 300mAp-p).

(3) To measure the erased width X of a recorded signal by applying a ferromagnetic colloid to the tape.

The erased width X of ten erase heads each having somewhat different dimension of the above described factors is measured in accordance with the foregoing procedures. The result is represented in the following Table 2.

TABLE 2

| head No. | S Sendust side width (μm) | T opposed width (μm) | $D_1$ offset (μm) | $D_2$ offset (μm) | X erased width (μm) | X-S (μm) | X-T (μm) |
|---|---|---|---|---|---|---|---|
| 1 | 41.5 | 40 | 0.8 | 0.7 | 45 | 3.5 | 5 |
| 2 | 43 | 41 | 1.0 | 1.0 | 46 | 3 | 5 |
| 3 | 44.5 | 41 | 1.5 | 2.0 | 47 | 2.5 | 6 |
| 4 | 42 | 41 | 0.3 | 0.7 | 45 | 3 | 4 |
| 5 | 44 | 40 | 2.0 | 2.0 | 47 | 3 | 7 |
| 6 | 45 | 41 | 4.0 | −1.0 | 48 | 3 | 7 |
| 7 | 44 | 40.5 | −0.5 | 3.5 | 47 | 3 | 6.5 |
| 8 | 41 | 39.5 | 1.5 | −0.5 | 44 | 3 | 4.5 |
| 9 | 43 | 42 | 0.5 | 0.5 | 46 | 3 | 4 |
| 10 | 44 | 41 | −1.0 | 3.0 | 47 | 3 | 6 |

As obvious from the foregoing Table 2, if the offsets $D_1$ and $D_2$ between an end of a Sendust film 3 and an end of a ferrite core half 1 show in FIG. 2 are within the rage of −1 to +4 μm, the erased track width X much more correlates with the width S of the Sendust film 3 having a high saturation magnetic flux density than with the width T of the portion in which both magnetic materials 1 and 3 are completely opposed to each other. More specifically, the erased track width X is always approximately 3 μm larger than the width S of the Sendust film 3.

Therefore, it has been found that the effective erased track width X of a rotary erase head 10 having a structure as shown in FIGS. 1 and 2 is determined by the dimension S in the track-width direction of a magnetic material, that is, the Sendust film 3, having a larger saturation magnetic flux density out of a pair of opposed magnetic materials forming a gap of the above described rotary erase head 10. Further, the fringing flux of the rotary erase head 10 which is effective as erasing magnetic flux leaks by approximately 1.5 μm outwardly in the track-width direction (the total of 3 μm in both ends), that is, to the range of approximately a half of the gap length G (3 μm) of a gap 4 from an end P1 in the track-width direction in the neighborhood of a gap of the above described magnetic material 3 having a larger saturation magnetic flux density.

Accordingly, according to the present invention, fringing magnetic flux of the erase head is considered in the positional relation of the rotary erase head and the recording head to a tape, so that an end P1, located forward with respect to the tape travelling direction, of the both ends in the track-width direction of the magnetic material having a larger saturation magnetic flux density, may trace the backward portion, apart by a distance in which fringing magnetic flux does not reach, as compared with the backward end with respect to the tape travelling direction of the adjacent track previously recorded.

Figure 9:
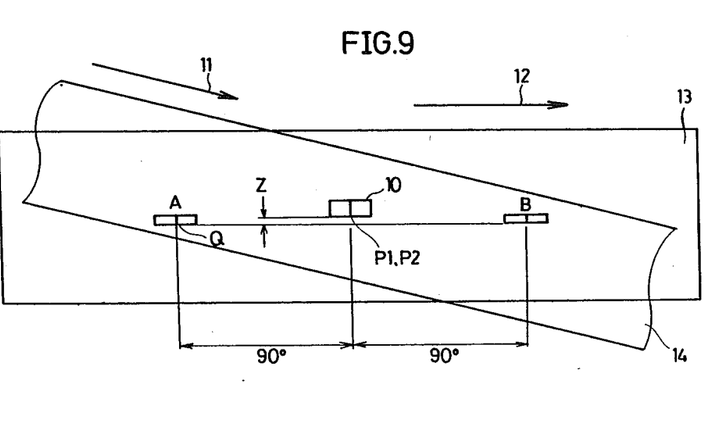
FIG. 9 is a side elevational view illustrating a head cylinder system of a magnetic recording apparatus of an embodiment according to the present invention.

FIG. 9 is a side elevational view showing a head cylinder system of an embodiment according to the present invention for achieving the above described principle. The head cylinder system shown in FIG. 9 is identical to the conventional head cylinder system shown in FIG. 4 except for the following. More specifically, the rotary erase head 10 is spaced upward from the recording heads A and B with respect to the axial direction of a rotary cylinder 13, by a distance Z=(a track pitch)×½+ (the gap length G of the rotary erase head 10)×½.

Figure 10:
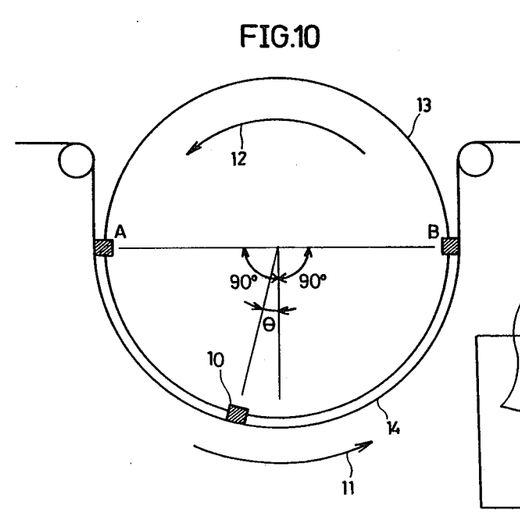
FIG. 10 is a plan view illustrating a head cylinder system of a magnetic recording apparatus of another embodiment according to the present invention.

FIG. 10 is a plan view showing a head cylinder system of another embodiment according to the present invention for achieving the above described principle. The embodiment shown in FIG. 10 is identical to the head cylinder system of the conventional VTR shown in FIGS. 3 and 4 in that the difference in the distance between the rotary erase head and the recording heads in the axial direction of the rotary cylinder 13 is Z=(a track pitch)×½. On the other hand, they differ in that the rotary erase head 10 is attached to the preceding position by (90°−θ) in the circumferential direction of the rotary cylinder 13 relative to the head A, where θ is shown by the following equation:

$$\theta = 180° \times \text{(a half of the gap length G of the erase head 10)/(a track pitch)}.$$

FIG. 11 is a diagram showing diagrammatically a track pattern formed on a magnetic tape by the head cylinder system of the embodiment shown in FIGS. 9 and 10.

When the rotary erase head 10 is attached to the rotary cylinder 13 in the positional relation as shown in FIGS. 9 or 10, the rotary erase head 10 traces the backward portion, apart by a distance of a half of the gap length G of the rotary erase head 10, as compared with a forward end Q with respect to the tape travelling direction 11 of a recording track 15a to be formed by the head A immediately after erasing by the above described rotary erase head 10, which erases two tracks, that is, the track 15a and a track on the left side thereof (not shown). In doing so, a portion of the track 15a on the side of the forward end Q is erased over the width of a half of the gap length G of the rotary erase head 10 by fringing flux generated in the neighborhood of the forward end P1 of the rotary erase head. On the other hand, a portion of the track 15B on the side of the backward end previously formed by the head B is not substantially affected by fringing magnetic flux. Therefore, even if erasing and recording are continuously performed for each one picture, a part of the recorded pattern 15B, formed by the recording head B scanning the tape immediately before erasing is performed by the rotary erase head 10 is not erased by fringing magnetic flux of the above described rotary erase head 10, and outputs reproduced from the recorded patterns by the two recording heads A and B, each having a different azimuth, become equal, so that a clear picture image can be obtained.

Additionally, if the width S of the Sendust film 3, having a larger saturation magnetic flux density, is rendered to be smaller, by the width in which the above described fringing effect reaches (the gap length G of the rotary erase head 10) twice the length of a track pitch, editing of a tape such as perfect assembly recording and insert assembly recording can be better performed.

Figure 12A:
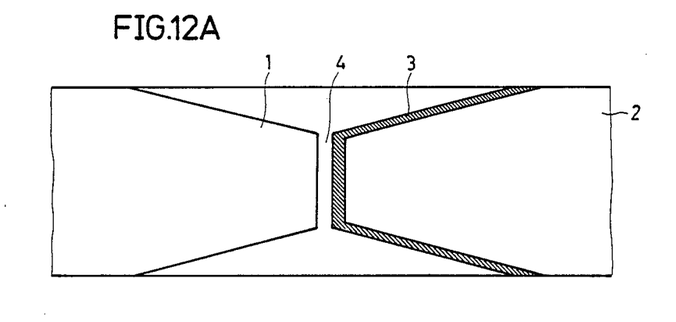
FIGS. 12A to 12C are plan views showing diagrammatically various magnetic heads capable of being applied to the embodiments according to the present invention shown in FIGS. 9 and 10.
Figure 12B:
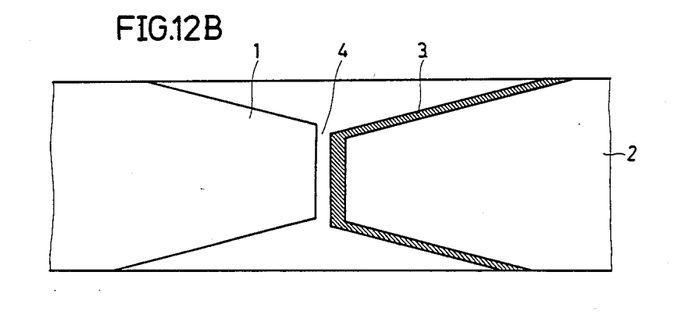
Figure 12C:
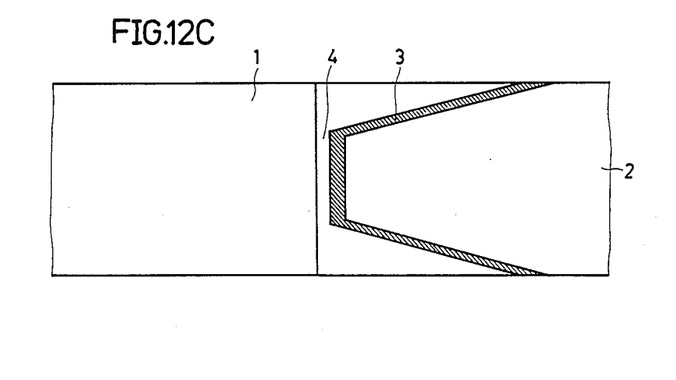

FIGS. 12A to 12C are plan views showing diagrammatically various magnetic heads capable of applying to the embodiment of the present invention shown in FIGS. 9 and 10. More specifically, the present invention is effective not only for magnetic head having a different opposing width between the ferrite core half 1 and the Sendust film 3 as shown in FIG. 2, but also for a magnetic head having the same opposing width between the ferrite core half 1 and the Sendust film 3 in the gap 4 as shown in FIG. 12A, a magnetic head in which the ferrite core half 1 and the Sendust film 3 are asymmetrically offset as shown in FIG. 12B and a magnetic head in which the side of the ferrite core half 1 is not processed to form a track as shown in FIG. 12C.

In accordance with the above described embodiment, a magnetic head is adapted such that different kind of magnetic materials such as the ferrite core half 1 and the Sendust film 3 are opposed to each other, with the nonmagnetic gap 4 interposed therebetween. However, a magnetic head comprising a pair of the same kind of opposing magnetic materials can be used to obtain the same effect. In this case, as shown in FIG. 9, each head is attached in such the positional relation that, instead of the above described P1, an end P2, located most forward with respect to the tape travelling direction, of each end in the track-width direction of a pair of magnetic materials may trace the more backward side than Q.

Figure 13:
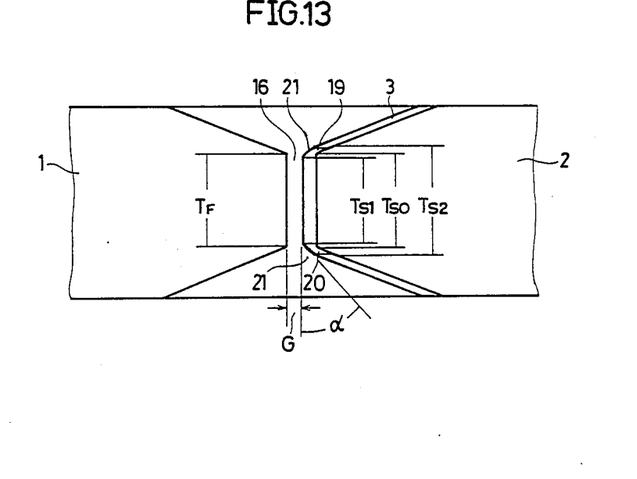
FIG. 13 is a plan view showing diagrammatically the neighborhood of an abutting surface of a rotary erase head of another embodiment according to the present invention to a tape.

FIG. 13 is a plan view showing diagrammatically the neighborhood of an abutting surface of the rotary erase head of another embodiment according to the present invention to the magnetic tape.

The rotary erase head shown in FIG. 13 is identical to the conventional rotary erase head shown in FIG. 6 except that notches 21 are formed in corners 19 and 20 of a Sendust film 3 facing an operating gap 16, so that a gap between the notch 21 and the ferrite core half 1 opposed thereto is gradually increased up to approximately twice as large as the operating gap. As a result, a magnetic field leaks from the notches 21 and the erased width becomes large.

Figure 14:
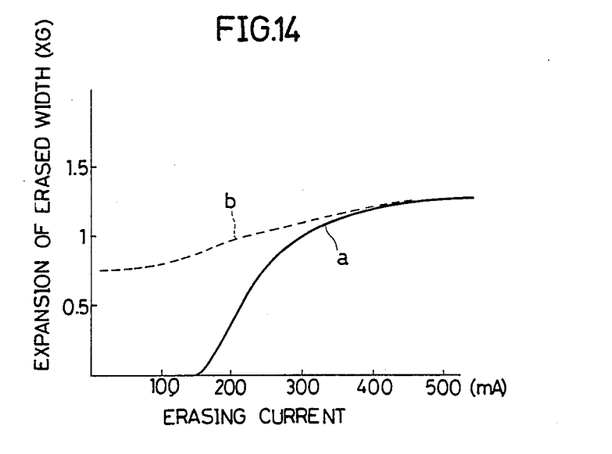
FIG. 14 is a graph showing a relation between the erasing current of the rotary erase head of another embodiment according to the present invention shown in FIG. 13 and the erased width.

FIG. 14 is a graph showing a relation between erasing current of the rotary erase head and the expansion of the erased width. In FIG. 14, the solid line a represents the case of the conventional rotary erase head similarly to FIG. 8 and the dashed line b represents the case of the rotary erase head with which the notch 21 shown in FIG. 13 is provided. As seen from FIG. 14, when the rotary erase head shown in FIG. 13 is used, the erased width hardly changes even if erasing current of 200 to 300 mA flows, and becomes a sum of the track width $T_{S1}$ on the side of the Sendust film 3 and the gap length G which is approximately constant. As to the shape of the notch 21, it is desirable that the value α meets a relation of $30° \leq \alpha \leq 60°$ to provide an appropriate leakage magnetic field. The optimum result can be obtained particularly when a relation, $T_{S2} - T_{S1} = G$ with $\alpha = 45°$ is met. Therefore, according to the embodiment, a rotary erase head having a constant expansion of the erased width can be obtained. The effect of fringing magnetic flux to the adjacent tracks recorded can be further reduced by applying the rotary erase head to a head cylinder system of the embodiment as shown in FIGS. 9 and 10.

Figure 15:
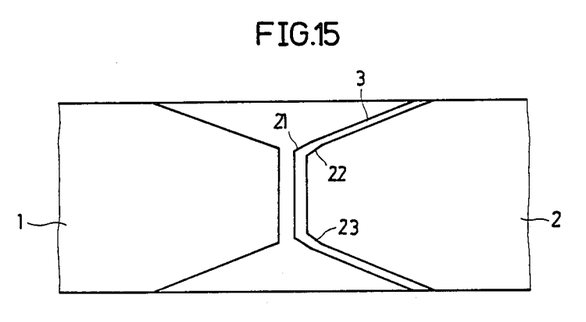
FIG. 15 is a plan view showing diagrammatically a variation of the embodiment according to the present invention shown in FIG. 13.

FIG. 15 shows a variation of the embodiment shown in FIG. 13, in which corners 22 and 23 of the ferrite core half 2 are previously processed and the Sendust film 3 is formed thereon, so that the notches 21 are automatically provided in the corners of the Sendust film 3.

Figure 16:
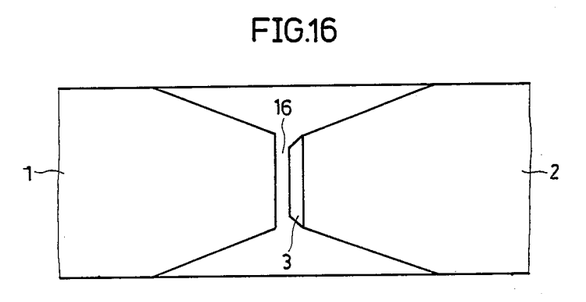
FIG. 16 is a plan view showing diagrammatically another variation of the embodiment according to the present invention shown in FIG. 13.

FIG. 16 shows another variation of the embodiment shown in FIG. 13, in which the Sendust film 3 is processed by a dicing saw or the like after formation of the Sendust film 3.

In accordance with the embodiment shown in FIG. 13, a magnetic head in which the Sendust film 3 is formed only on a single ferrite core half 2 was described. However, the present invention can be applied to a magnetic head in which a metal film such as a Sendust film is also formed on the ferrite core half 1 opposed thereto.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recording apparatus of a helical scanning system comprising:
   a cylinder (13) having a rotating surface (13a),
   recording heads (A and B) mounted to slightly project from the rotating surface of said cylinder, and
   an erase head (10) mounted to slightly project from the rotating surface of said cylinder, said erase head having a surface abutting a tape recording medium, wherein said surface of the erase head includes a pair of magnetic materials having different saturation magnetic flux densities, said magnetic materials being spaced from one another to form a gap therebetween with a non-magnetic material layer formed in said gap, wherein said gap has a predetermined gap length between said pair of magnetic materials, said recording heads and said erase head being disposed such that an end (P1) of the erase head is positioned forward, with respect to the tape travelling direction, in relation to both ends in a track width direction, said track width direction being the thickness direction of said cylinder of the one magnetic material which has a larger saturation magnetic flux density, and wherein said end (P1) traces a backward side, with respect to the tape travelling direction, wherein said backward side trace is spaced apart by a constant distance, in the track-width direction, from an end (Q) located forward, with respect to the tape travelling direction, of both ends of a recorded track pattern, formed on the tape by the recording head scanning the tape immediately after erasing by said erasing head.

2. A magnetic recording apparatus in accordance with claim 1, wherein said constant distance is a half of the gap length (G) of said erase head.

3. A magnetic recording apparatus in accordance with claim 1, wherein said erase head is attached to be placed apart from the recording head by a distance which is a half of a track pitch in a direction corresponding to a bckward direction with respect to the tape travelling direction, of the axial direction of said cylinder and is also attached in the position preceding by an angle of $(90° - \theta)$ in the circumferential direction relative to said recording head, where said $\theta$ is determined according to the following equation:

$$\theta = 180° \times \text{(a half of a gap length of said erase head)}/\text{(a track pitch)}.$$

4. A magnetic recording apparatus in accordance with claim 1, wherein said erase head has a groove portion for regulating a track width and expanding outwardly toward the track-width direction in the side portion of said gap structure, and said magnetic material having a larger saturation magnetic flux density, out of a pair of magnetic materials in said erase head has a notch in a corner facing said gap structure.

5. A magnetic recording apparatus in accordance with claim 4, wherein the length of said notch is approximately a half of the gap length of said erase head.

6. A magnetic recording apparatus in accordance with claim 1, wherein the track-width dimension of said magnetic material having a larger saturation magnetic flux density is smaller than twice of a track pitch by the gap length of said erase head.

7. A magnetic recording apparatus of a helical scanning system comprising:

a cylinder (13) having a rotating surface (13a), recording heads (A and B) mounted to slightly project from the rotating surface of said cylinder, and an erase head (10) mounted to slightly project from the rotating surface of said cylinder, said erase head having a surface abutting a tape recording medium, wherein said surface of the erase head includes a pair of magnetic materials having the same saturation magnetic flux densities, said magnetic materials being spaced from one another to form a gap therebetween with a non-magnetic material layer formed in said gap, wherein said gap has a predetermined gap length between said pair of magnetic materials, said recording heads and said erase head being disposed such that an end (P2) of the erase head is positioned most forward, with respect to the tape travelling direction, in relation to each end in a track width direction, said track width direction being the thickness direction of said cylinder, and wherein said end (P2) traces a backward side, with respect to the tape travelling direction, wherein said backward side trace is spaced apart by a constant distance, in the track-width direction, from an end (Q) located forward, with respect to the tape travelling direction, of both ends of a recorded track pattern, formed on the tape by the recording head scanning the tape immediately after erasing by said erasing head.

8. A magnetic recording apparatus in accordance with claim 7, wherein said constant distance is a half of the gap length of said erase head.

9. A magnetic recording apparatus in accordance with claim 7, wherein said erase head is attached to be placed apart from said recording head by a distance which is a half of a track pitch in a direction corresponding to a backward direction with respect to the tape travelling direction, of the axial direction of said cylinder and is also attached in the position preceding by an angle of $(90° - \theta)$ in the circumferential direction relative to said recording head, wherein said $\theta$ is determined according to the following equation:

$$\theta = 180° \times \text{(a half of the gap length (G) of said erase head)}/\text{(a track pitch)}.$$

10. A magnetic recording apparatus in accordance with claim 7, wherein said erase head has a groove portion for regulating a track width and expanding outwardly toward the track-width direction in the side portion of said gap structure, and a pair of magnetic materials of said erase head have notches in the corners facing said gap structure, respectively.

11. A magnetic recording apparatus in accordance with claim 10, wherein the length of said notch is approximately a half of the gap length of said erase head.

* * * * *